Patented Sept. 26, 1950

2,523,712

UNITED STATES PATENT OFFICE 2,523,712

PROCESS OF PREPARING 3,5-DIIODO-CHELIDAMIC ACID

Henri Gustave Morren, Forest-Brussels, Belgium

No Drawing. Application December 6, 1946,
Serial No. 714,635

3 Claims. (Cl. 260—295.5)

Among substances used for contrasting purposes in the radiography of the urinary organs, the N.methyl-3,5-diiodochelidamic acid has been found to be of very remarkable efficacy.

This substance was prepared from pure, 3,5-diiodochelidamic acid which hitherto was produced by treatment of chelidamic acid with iodine in alkaline solution, by the Lerch method (Monatshefte für Chemie 5, (1884), 401). This method was subsequently improved by repeated acidifying and alkalinising operations (Dohrn U. S. Patent No. 1,869,672). The yield in 3,5-diiodochelidamic acid can be increased in this way, but the treatment then becomes very slow.

I now have found that the conversion of chelidamic acid into 3,5-diiodochelidamic acid can be very easily effected by introducing iodine chloride into an aqueous suspension of chelidamic acid in water at 90–95° C., or into a neutral solution of disodium chelidamate heated to the same temperature, or again into a solution containing also an alkaline bicarbonate.

Iodination takes place at once and the yield in pure product exceeds 80% of the theoretical yield.

This process is not suitable for iodination of N.methylchelidamic acid.

Example

To 256 parts of chelidamic acid in 7000 parts of water I add 200 to 275 parts of sodium bicarbonate (the formation of disodium chelidamate requires theoretically 235.2 parts of $NaHCO_3$) and after heating to 95° C. I introduce 570 parts of iodine chloride. After the reaction, the boiling solution is discolored by means of gaseous $SO_2$ and is filtered at boiling temperature, and the resulting product is allowed to crystallise in a refrigerator. The 3,5-diiodochelidamic acid then is separated, washed with ice cold water and dried. 490 parts of quite pure 3,5-diiodochelidamic acid are obtained.

I claim:

1. A process of preparing 3,5-diiodochelidamic acid comprising preparing an aqueous solution of chelidamic acid and sodium bicarbonate, heating said solution to 90–95° C., and introducing iodine chloride into said heated solution.

2. A process of preparing 3,5-diiodochelidamic acid comprising the step of subjecting chelidamic acid to iodination by means of iodine chloride in an aqueous medium containing sodium bicarbonate.

3. A process of preparing 3,5-diiodochelidamic acid comprising preparing a suspension of chelidamic acid in an aqueous medium containing sodium bicarbonate, heating said suspension to 90–95° C., and introducing iodine chloride into said heated suspension.

HENRI GUSTAVE MORREN.

REFERENCES CITED

The following references are of record in the file of this patent:

UNITED STATES PATENTS

| Number | Name | Date |
|---|---|---|
| 1,869,672 | Dohrn | Aug. 21, 1932 |

OTHER REFERENCES

J. für Praktische Chemie, 1936, Bd. 145, pp. 257–264.

Chem. Abstracts, Glen, vol. 30, 1936, p. 5225.

Groggins Unit Processes in Organic Synthesis, McGraw-Hill, 1938, p. 157.

Houben Die Method der Organische Chemie, vol. 3, pp. 1186 and 1187.